(12) United States Patent
Vacon et al.

(10) Patent No.: US 7,606,573 B1
(45) Date of Patent: Oct. 20, 2009

(54) WIRELESS SWITCHED NETWORK

(75) Inventors: Gary Vacon, East Falmouth, MA (US); Paul D. Callahan, Carlisle, MA (US); Floyd J. Backes, Sharon, NH (US); William R. Hawe, Hollis, NH (US)

(73) Assignee: Autocell Laboratories, Inc., Acton, MA (US)

( * ) Notice: Subject to any disclaimer, the term of this patent is extended or adjusted under 35 U.S.C. 154(b) by 1044 days.

(21) Appl. No.: 10/673,636

(22) Filed: Sep. 29, 2003

Related U.S. Application Data

(60) Provisional application No. 60/414,437, filed on Sep. 27, 2002.

(51) Int. Cl.
*H04W 40/00* (2009.01)

(52) U.S. Cl. ............... 455/446; 455/447; 455/422.1; 455/424; 370/329; 370/343

(58) Field of Classification Search .......... 455/435.2, 455/435.1, 422.1, 453, 450, 452.1, 424, 423, 455/456.1–457, 524, 525, 500, 446, 447; 370/328–338
See application file for complete search history.

(56) References Cited

U.S. PATENT DOCUMENTS

| | | | |
|---|---|---|---|
| 5,493,694 A | 2/1996 | Vlcek et al. | |
| 5,606,727 A | 2/1997 | Ueda | |
| 5,923,702 A * | 7/1999 | Brenner et al. | 375/133 |
| 5,924,030 A * | 7/1999 | Rautiola et al. | 455/426.1 |
| 5,933,420 A * | 8/1999 | Jaszewski et al. | 370/329 |
| 5,963,848 A | 10/1999 | O'Avello | |
| 6,111,867 A | 8/2000 | Mann | |
| 6,198,924 B1 | 3/2001 | Ishii et al. | |
| 6,208,629 B1 * | 3/2001 | Jaszewski et al. | 370/329 |
| 6,215,779 B1 | 4/2001 | Bender | |
| 6,266,537 B1 | 7/2001 | Kashitani et al. | |
| 6,332,077 B1 | 12/2001 | Wu et al. | |
| 6,334,047 B1 * | 12/2001 | Andersson et al. | 455/69 |

(Continued)

OTHER PUBLICATIONS

IEEE, Wireless LAN Medium Access Control (MAC) and Physical Layer (PHY) specifications. Statdard 802.11,1999 edition, Reference No. ISO/IEC 8802-11:1999(E), 528 Pages.

(Continued)

*Primary Examiner*—Ajit Patel
*Assistant Examiner*—Khai M Nguyen
(74) *Attorney, Agent, or Firm*—Anderson, Gorecki & Manaras LLP

(57) ABSTRACT

An access point in a wireless network includes an external indication of the access point's proximity to another access point. The external indication can be a LED that blinks at a rate that is related to the proximity of the access point to the other access point. An access point is also capable of producing a network map that indicates the access point's proximity relative to other access points that are coupled to the network. The access point is further capable of monitoring wireless network traffic to ascertain whether wireless network traffic has exceeded a threshold, and if so, releasing some client devices so that wireless network traffic no longer exceeds the threshold. The access point is also capable of automatically choosing one of a plurality of radio frequencies on which to operate. The access point chooses a frequency after evaluating frequencies on which other access points may be operating.

2 Claims, 15 Drawing Sheets

U.S. PATENT DOCUMENTS

| | | | |
|---|---|---|---|
| 6,452,498 B2* | 9/2002 | Stewart | 340/573.1 |
| 6,522,881 B1 | 2/2003 | Feder | |
| 6,560,462 B1 | 5/2003 | Ravi et al. | |
| 6,574,474 B1 | 6/2003 | Nielsen | |
| 6,574,477 B1 | 6/2003 | Rathunde | |
| 6,636,737 B1 | 10/2003 | Hills | |
| 6,729,929 B1* | 5/2004 | Sayers et al. | 455/446 |
| 6,732,163 B1* | 5/2004 | Halasz | 709/220 |
| 6,738,599 B2 | 5/2004 | Black | |
| 6,741,863 B1 | 5/2004 | Chiang et al. | |
| 6,760,748 B1 | 7/2004 | Hakim | |
| 6,795,407 B2 | 9/2004 | Chesson | |
| 6,870,815 B2 | 3/2005 | McFarland et al. | |
| 7,162,507 B2* | 1/2007 | Carter | 709/200 |
| 2001/0010460 A1* | 8/2001 | Miller et al. | 324/67 |
| 2002/0060995 A1 | 5/2002 | Cervello et al. | |
| 2002/0141375 A1 | 10/2002 | Choi | |
| 2002/0176437 A1* | 11/2002 | Busch et al. | 370/437 |
| 2002/0193113 A1 | 12/2002 | Sayeedi et al. | |
| 2003/0002456 A1 | 1/2003 | Soomro et al. | |
| 2003/0022686 A1 | 1/2003 | Soomro et al. | |
| 2003/0190915 A1* | 10/2003 | Rinne et al. | 455/436 |
| 2003/0207699 A1* | 11/2003 | Shpak | 455/525 |
| 2004/0054767 A1 | 3/2004 | Karaoguz et al. | |
| 2004/0054774 A1* | 3/2004 | Barber et al. | 709/224 |
| 2004/0137915 A1 | 7/2004 | Diener et al. | |
| 2004/0165557 A1* | 8/2004 | Backes et al. | 370/332 |
| 2004/0174852 A1* | 9/2004 | Backes et al. | 370/338 |
| 2004/0203863 A1* | 10/2004 | Huomo | 455/456.1 |
| 2004/0214572 A1* | 10/2004 | Thompson et al. | 455/435.2 |

OTHER PUBLICATIONS

Michael Barr, "Tower a Smaller Java", Embedded.com, Jun. 14, 2002, pp. 1-9.

Moustafa Youssef, "Handling Samples Correlation in the Horus System", IEEE INFOCOM 2004.

Kin K. Leung, "Integrated Link Adaptation and Power Cottrol for Wireless IP Networks", AT&T Labs-research, Jan. 19, 2000.

Ana Zapater et al. "Development and Implementation of a Bluetooth Networking Infrastructure for the a Notebook—University Scenario", Institute of Communications Engineering, University of Hannover, May 13, 2003.

Walter Klotz, "Graph Coloring Algorithms", 1999.

Brent N. Chun at al., "Market-based Proportional esource Sharing for Clusters", University of California at Berkeley computer Science Division, Sep. 1999.

The Four Color Theorem, Web page, authors(s) unknown, updated Nov. 13, 1995.

* cited by examiner

WIRELESS SWITCHED NETWORK

RELATED APPLICATIONS

This application claims priority to provisional application Ser. No. 60/414,437 filed Sep. 27, 2002.

FIELD OF THE INVENTION

The invention is related generally to wireless networks, and more particularly to configuration and bandwidth optimization in wireless networks.

BACKGROUND OF THE INVENTION

The development of wireless networking technologies has greatly improved the mobility of laptop and handheld computer users. Wireless networking capability continues to increase productivity in the workplace and convenience in the home. As wireless networks become ubiquitous, ease of configuration and optimization of bandwidth become necessities.

In today's wireless networks, an access point typically operates on a particular frequency and provides wireless network access for client devices, or stations. There are typically a fixed set of frequencies upon which access points may operate. When building a relatively large wireless network, for example to cover an enterprise class business, many access points may be needed to provide wireless coverage. However, the only currently available means of optimizing the placement of access points is by manual trial and error. Furthermore, manual configuration is currently the only means of choosing non-interfering frequencies on which several access points can operate. There is currently no means of optimizing the distribution of clients among access points so that client bandwidth is maximized. It is desirable to provide new mechanisms for configuring and optimizing wireless networks that overcome the aforementioned shortcomings of current wireless networks.

SUMMARY OF THE INVENTION

Various aspects of the invention enable automatic configuration and optimization of wireless networks. In accordance with a first aspect of the invention, an access point operable to provide wireless network access to client devices coupled to a wireless network includes an external indication of the access point's proximity to another access point. According to one embodiment, the external indication is an LED, and the LED blinks at a rate that is related to the proximity of the access point to the other access point. This enables optimal placement of access points throughout the wireless network.

According to another aspect of the invention, an access point is capable of producing a network map that indicates the access point's proximity relative to other access points that are coupled to the network. According to a further aspect of the invention, an access point is capable of monitoring wireless network traffic to ascertain whether wireless network traffic has exceeded a threshold. The access point is capable of indicating to other access points coupled to the wireless network that the other access points should prepare to accept new client devices. The access point is capable of releasing some client devices so that wireless network traffic no longer exceeds the threshold. Automatic load balancing is thereby achieved.

In accordance with another aspect of the invention, an access point is capable of automatically choosing one of a plurality of radio frequencies on which to operate. The access point chooses a frequency after evaluating frequencies on which other access points may be operating. Automatic frequency selection is thereby achieved.

Similar methods and program products are provided to aid in ease of deployment and optimization of wireless networks.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
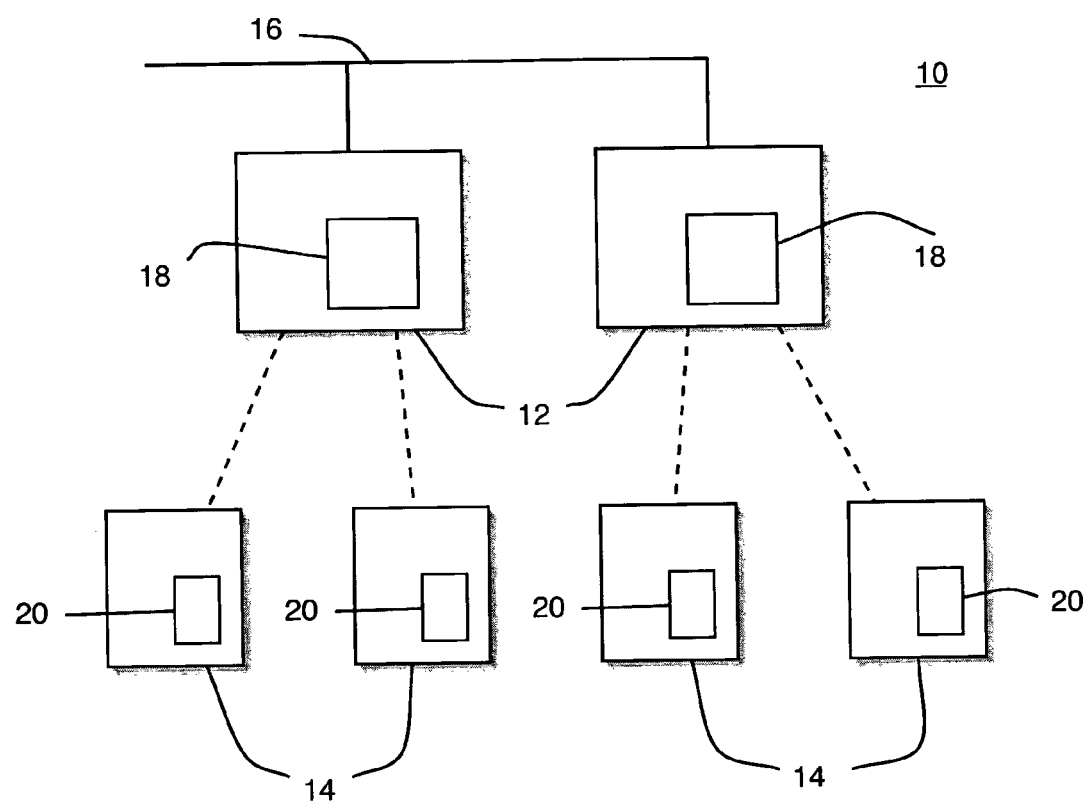
FIG. 1 is a schematic representation of a wireless network including access points and clients.

Shown in FIG. 1 is an example of a switched wireless network 10 in which the principles of the invention can be incorporated. The wireless network 10 includes access points 12 ("APs") and clients 14 (also referred to as stations). The APs 12 provide the clients 14 with wireless access to a network 16 to which the APs 12 are coupled. Each AP 12 includes an AP controller 18. Each client 14 includes a client controller 20. Algorithms operate in the controllers 18 and 20 that serve to dedicate as much bandwidth as possible to each of the clients 14 in the wireless network 10. The algorithms handle moves, adds and changes of both APs 12 and stations 14. The algorithms also enable the APs 12 and stations 14 to adapt to changing traffic patterns. The algorithms also enable detection and elimination of unauthorized systems. The algorithms accomplish these goals without user interaction. Described following is: I. Mechanisms for initializing various wireless network configurations; II. Mechanisms for supporting continuos operation; III. Mechanisms for naming wireless APs 12 so that they can be distinguished from each other.

I. The Following is a Description of an Algorithm for Automatically Assigning Cell Frequencies, Automatically Adjusting Transmit Power, Handling Flash Crowds, Moving/Adding Clients or Access Points, and Rogue Detection/Elimination.

New Installation

Figure 2:
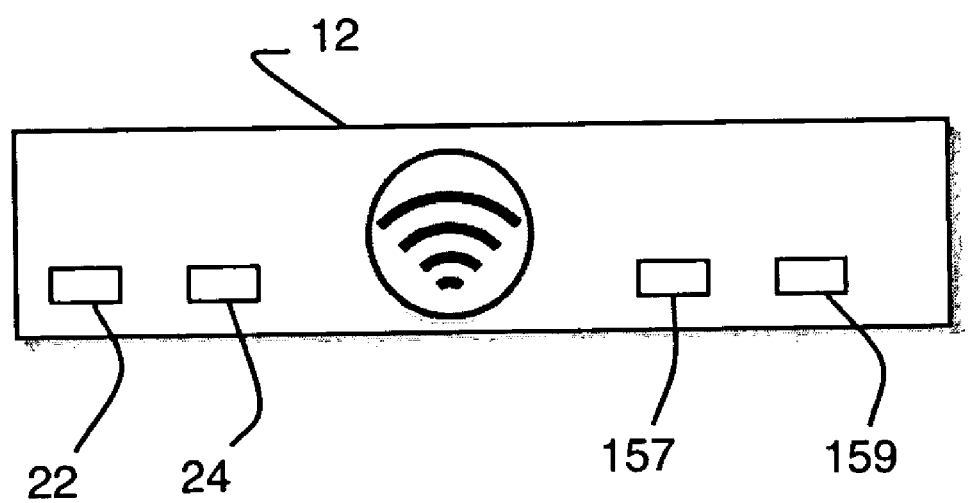
FIG. 2 is a representation of an access point including indicator LEDs.
Figure 3:
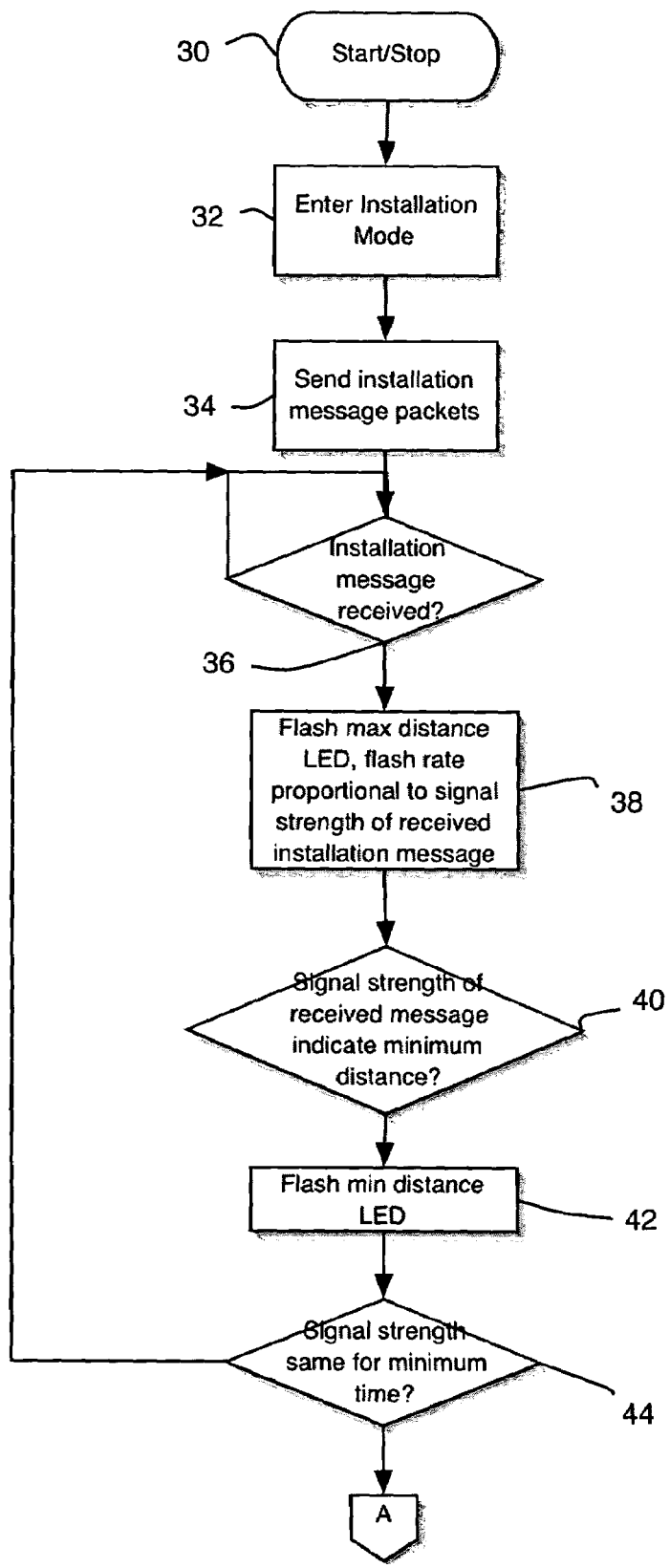
FIG. 3 is a flow diagram of the operation of an access point in installation mode.
Figure 4:
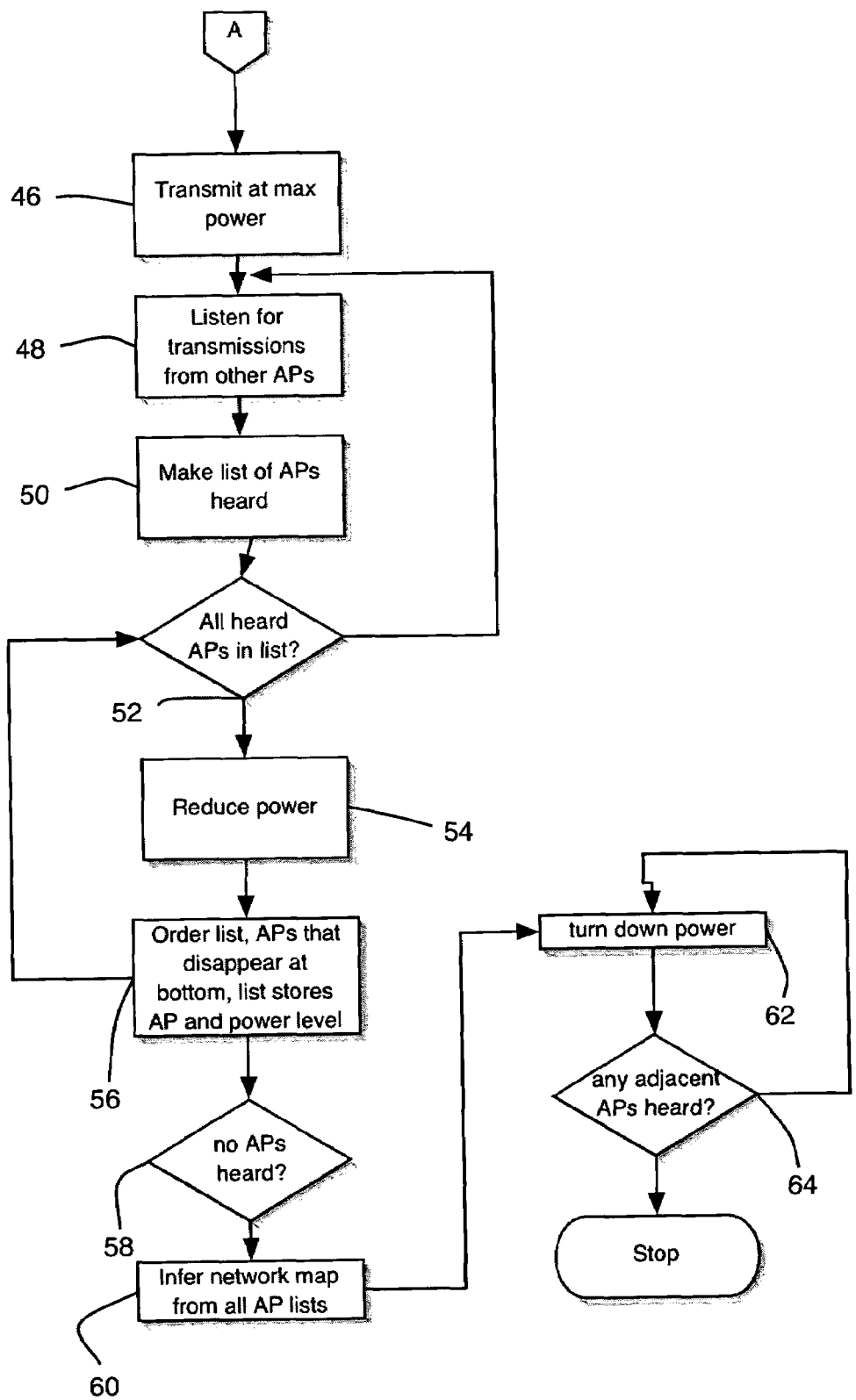
FIG. 4 is a flow diagram of the process by which an access point builds a network map.
Figure 5:
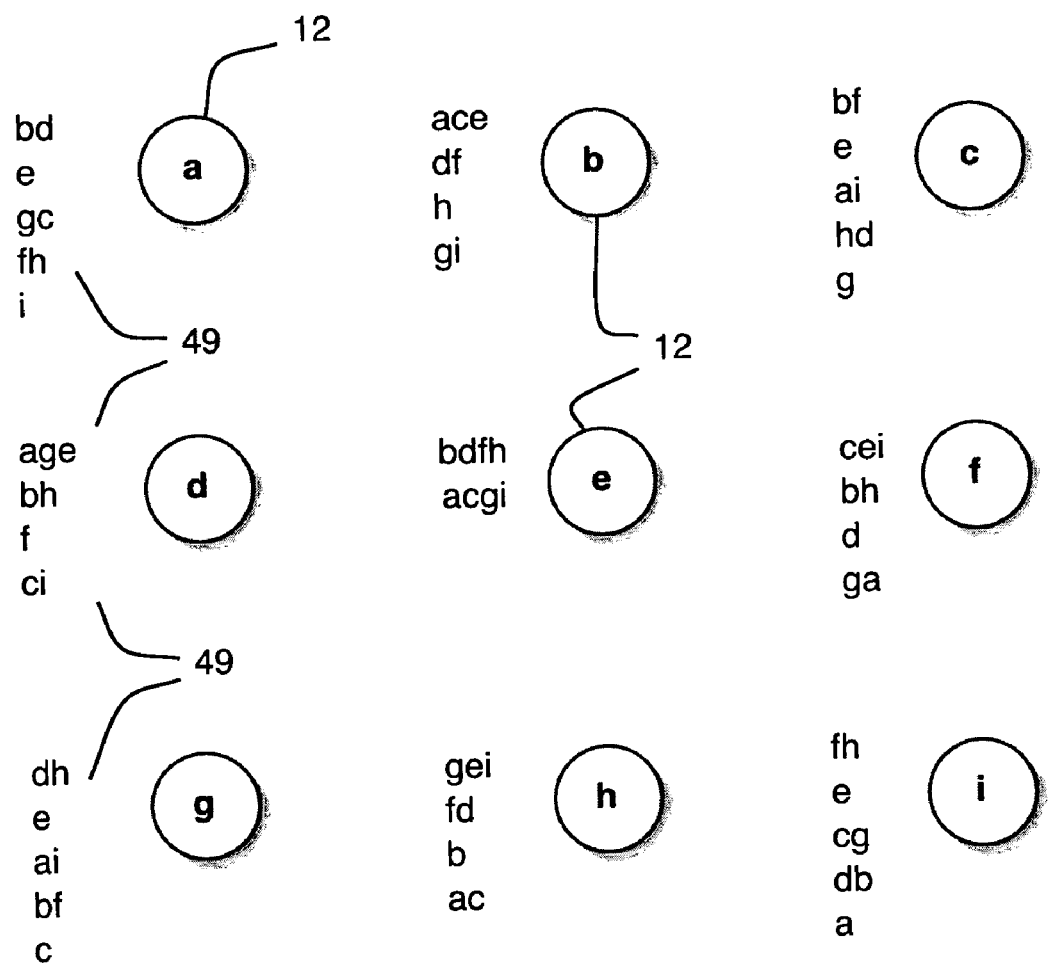
FIG. 5 is an example of network map lists stored at different access points for a particular network configuration.
Figure 6:
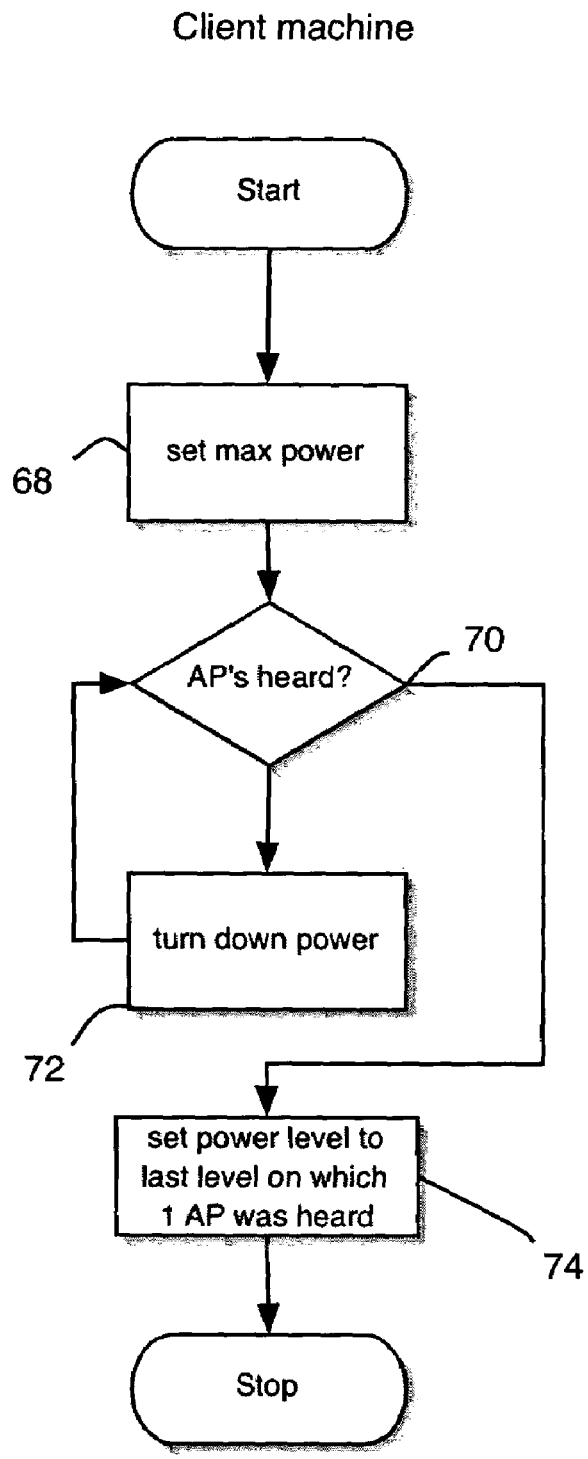
FIG. 6 is a flow diagram of the process by which clients initially associate with access points.

1. Referring to FIG. 2, APs 12 are positioned and installed using two installation LEDs 22 and 24. One LED 22 is for determining the maximum distance between APs 12 to get full coverage. The other LED 24 is for determining the minimum distance between APs 12 to get maximum bandwidth. Referring to FIG. 3, installation proceeds as follows:
   a. Upon power-up (step 30) APs 12 are put in an installation mode (e.g. via a switch) (step 32). They all transmit on the same frequency. They all listen on this frequency. They send a special installation message packet that can be differentiated from other transmissions from other sources (step 34). When this packet is received (step 36), the maximum distance LED 22 flashes, flash rate proportional to signal strength (step 38). The user moves away from an adjacent AP 12 until the flashing stops, and then moves towards it until the flashing just starts. That defines maximum distance. If there are multiple adjacencies, the user needs to activate installation mode on a pair at a time for each of the adjacent pairs.
   b. To insure the user doesn't put the APs 12 too close together, the minimum distance LED 24 is provided. This LED 24 is default set to approximately 12' spacing, but can be reset by the user by pressing a button, and moving any transmission source (client or AP) to the minimum distance (steps 40, 42). This distance is the minimum distance between a client 14 and the AP 12. 12' was chosen to represent a default ceiling height.
   c. The algorithm continues until the APs 12 stop moving relative to each other (step 44).
2. After APs 12 are installed, an algorithm runs that determines AP to AP adjacencies. Each AP 12 knows what AP 12 cells it borders on when the algorithm completes. Referring to FIG. 4:
   a. All APs 12 transmit a maximum power on the same frequency (step 46). All APs 12 listen (step 48), and make a list 49 of who they can hear (step 50, 52).
   b. All APs 12 gradually reduce their power output (step 54). The lists 49 are ordered based on attrition, the bottom of the list for each AP 12 has the APs that disappeared first. The list consists of an AP 12 plus the signal level at which it disappeared (step 56).
   c. The list 49 eventually gets to zero as power levels go to zero (step 58). Each AP 12 now has a completely ordered list 49. APs at the top of the list are adjacent. Those at the bottom are far apart. In FIG. 5 there are shown example lists 49 for each AP 12 in the configuration shown.
   d. The lists 49 from all APs 12 are compared (either centrally or distributed). A network map is inferred (step 60).
3. AP 12 power levels are adjusted so that the entire space is covered by RF. All APs 12 stay on the same frequency, for now. (step 62)
   a. Power levels are set so that adjacent APs 12 cannot hear each other, just barely. Turn down power just below the level of adjacent reception (step 64).
4. Now clients 14 associate with particular APs. All the clients stay on the same frequency initially. Referring to FIG. 6:
   a. Clients 14 start transmitting at max power (step 68). Clients 14 gradually turn down transmit power until they can be heard by at least 1 AP 12 (steps 70, 72).
   b. Set the power level (step 74).
   c. APs 12 remember who was close but not picked as adjacent. This is a secondary adjacency and helps determine later which side of an AP 12 a client is on.
5. Now use the AP map inferred from the lists 49 to pick non-interfering cell frequencies and move the clients to these frequencies.

New Client

Figure 7:
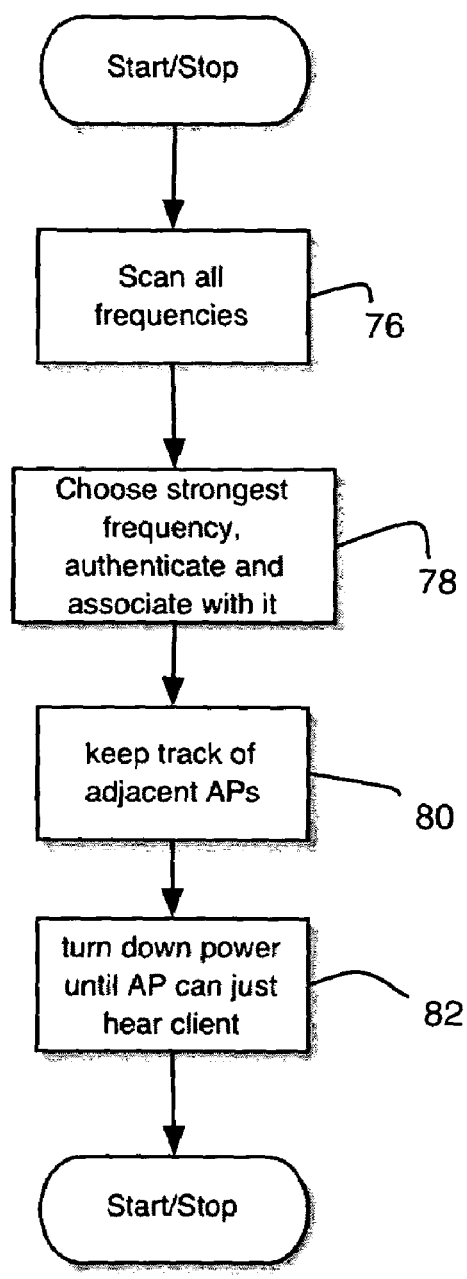
FIG. 7 is a flow diagram of the process by which a new client associates with an access point.

The following describes the behavior of a new client 14 that shows up in a particular cell. Referring to FIG. 7:
1. The client 14 scans all available frequencies (step 76) and picks the strongest, thus picking the closest AP 12 (step 78).
2. The client 14 notes the close, but not hottest frequencies, and identifies and keeps track of those APs 12 (call this a secondary adjacency) (step 80).
3. The client 14 picks the strongest frequency and turns down power until the AP 12 can just barely hear it (step 82).

Flash Crowd

Figure 8:
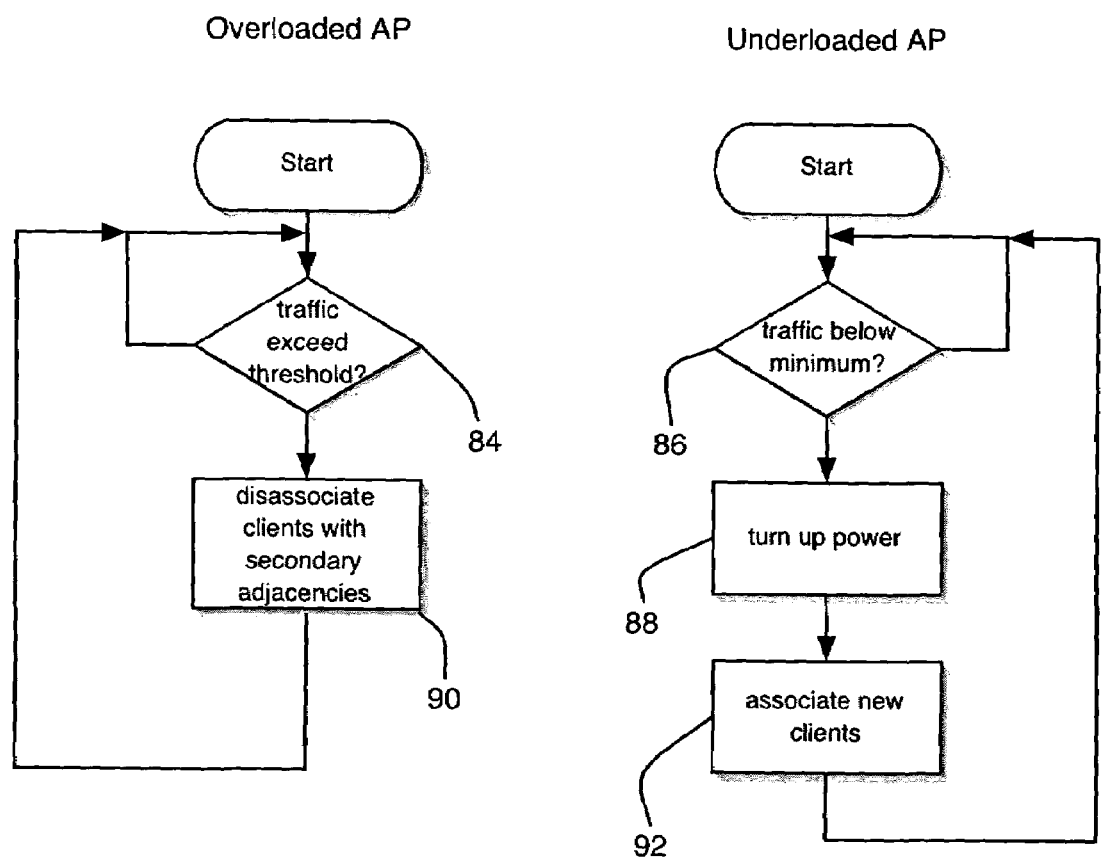
FIG. 8 is a set of flow diagrams showing the process by which access points perform load balancing.

A flash crown occurs, for example, when a group of people move to one side of the building. Referring to FIG. 8:
1. An AP 12 notices traffic above a certain threshold (step 84).
2. One or more adjacent APs 12 are relatively underloaded, as indicated by traffic falling below a minimum threshold (step 86).
3. One or more of the adjacent underloaded APs 12 turn up their power (step 88).
4. The overloaded AP 12 starts releasing clients 14. It chooses the clients 14 with the appropriate secondary adjacencies as described above (this means they are likely to be positioned between the old AP 12 and the new AP 12) (step 90).
5. They move to the frequency of the new AP 12.
6. The new AP 12 starts associating them (step 92).

Introduce a New AP

Figure 9:
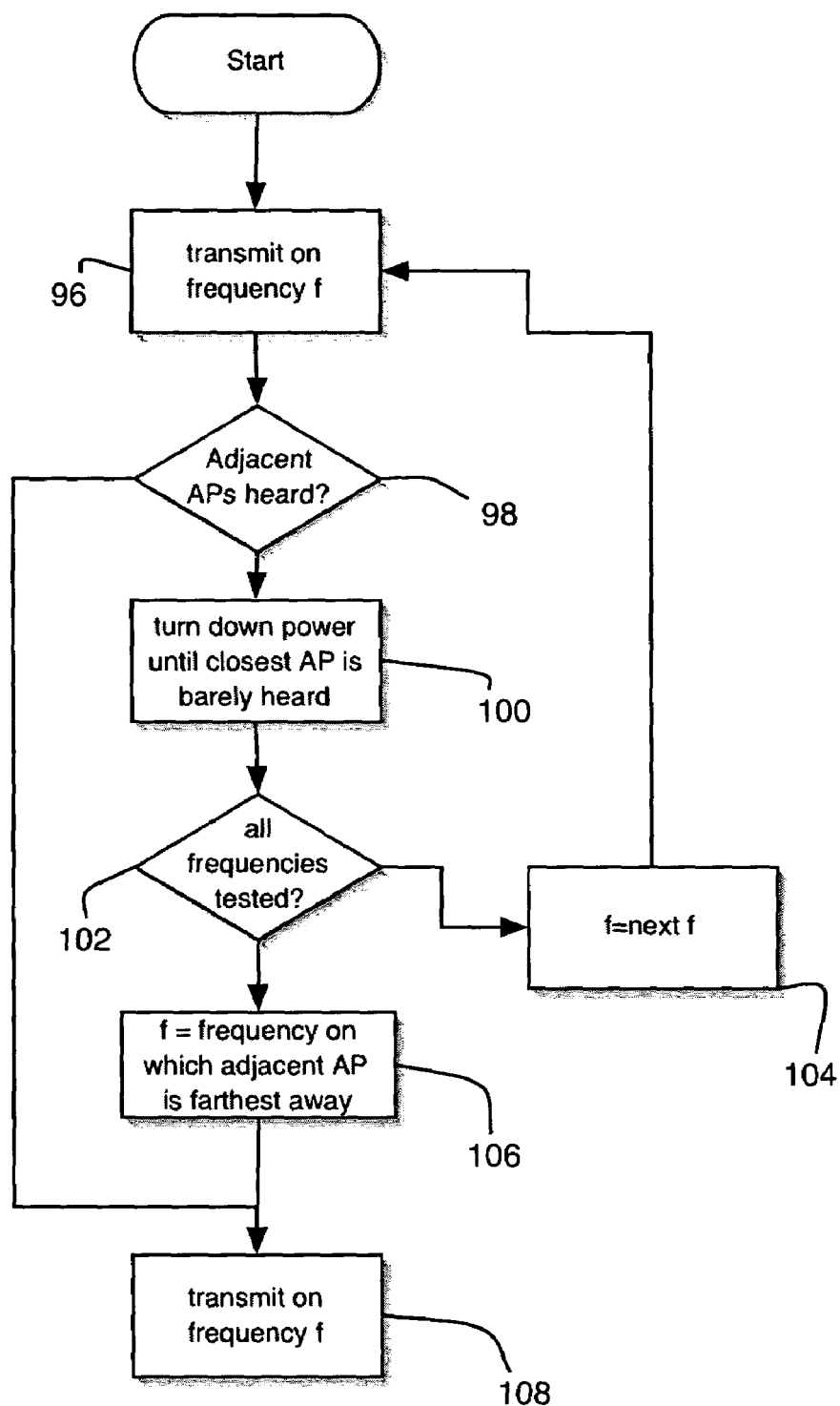
FIG. 9 is a flow diagram of the process by which access points automatically choose a frequency for operation.

A new AP 12 is placed in a cluster of existing APs 12. It needs to pick a channel, power, and associate some clients 14. Referring to FIG. 9:
1. The new AP 12 needs to ascertain its relative location. Transmit round robin on all frequencies, one at a time (step 96, 102, 104). The adjacent APs 12 hear this action. The new AP 12 is listening to the adjacent APs 12, one frequency at a time as it does this (step 98).
2. Turn down the new AP's power, and adjacent APs' power to get just beyond the reach of each other (like the initial install description) (step 100).
3. Pick a new minimally interfering channel (step 106). After all frequencies have been tested, pick the least interfering channel (step 108).
4. Adjacent APs 12 disassociate and the new AP 12 re-associates clients 14. Again the secondary adjacencies come into play, the new AP 12 associates clients 14 that are closer to the new AP 12, on the appropriate side of the old AP 12.

Jam an Intruder

Figure 10:
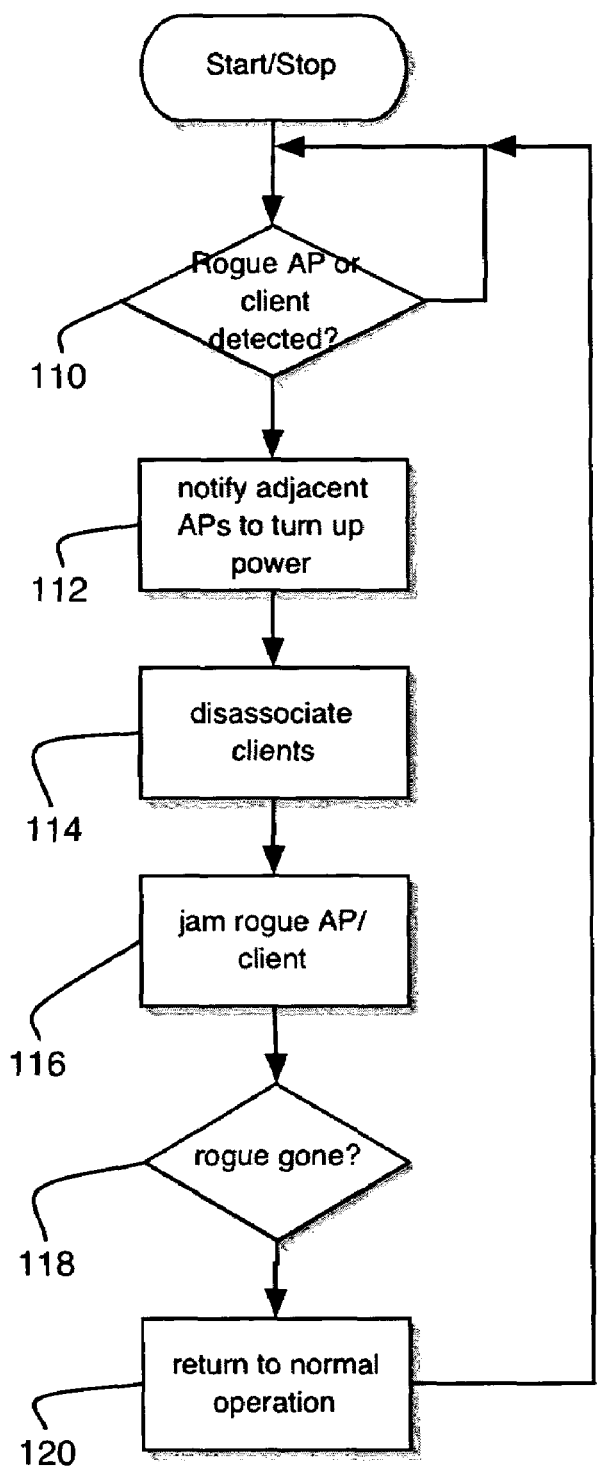
FIG. 10 is a flow diagram of the process by which access points jam rogue devices.

A rogue AP 12 or a rogue client 14 arrives, and is identified by a legitimate AP 12. Referring to FIG. 10:

1. Move clients 14 onto adjacent APs 12 using an algorithm similar to that described in the above section. That is, once a rogue AP 12 or client 14 is detected by an AP 12 (step 110), the AP 12 notifies adjacent APs 12 to turn up power (step 112). The AP 12 then disassociates its clients 14 (step 114).
2. The AP 12 that detected the rogue now turns into the jammer, transmitting loudly to block the rogue (step 116). When the rogue is no longer detected (step 118) the AP 12 returns to normal operation (step 120).

Figure 11:
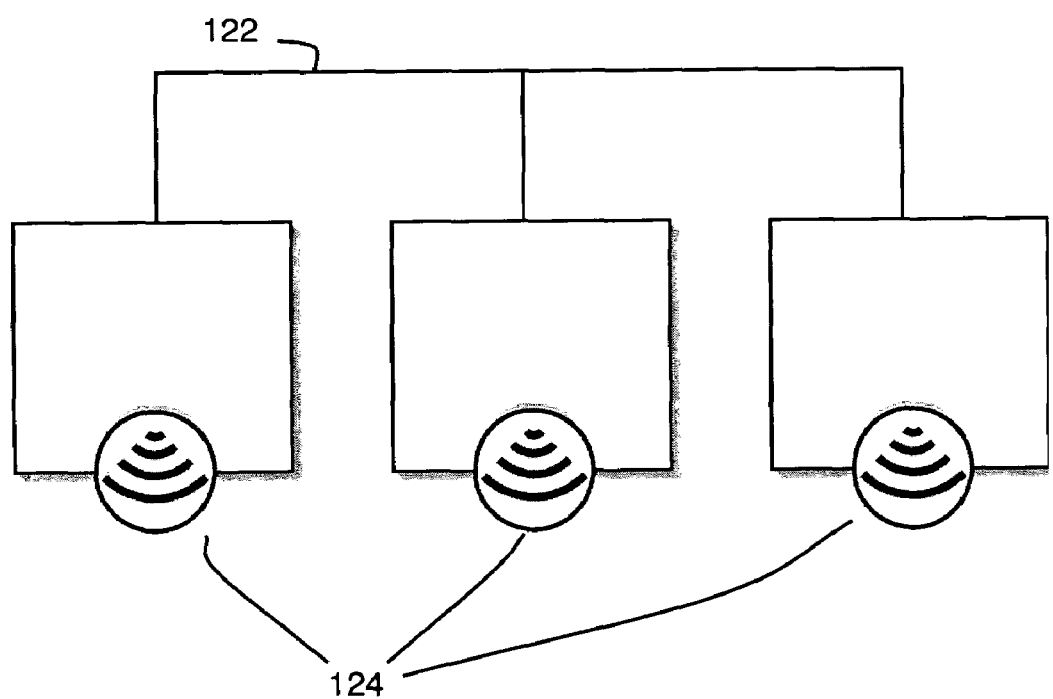
FIG. 11 is a schematic representation of several access points in communication via both a wired network and a wireless network.

II. The Following Sets Forth Various Scenarios that Take Place to Support Continuous Operation:

Control Channel Usage
  Referring to FIG. 11:
  1. AP-to-AP
    a. Wired—Routing control packets, commands are sent via a wired network, such as an Ethernet network 122, to adjacent APs 12 to listen on a specific channel for a roaming client.
    b. Radio—radio frequency 124, used only for power measurement and adjacency determination. Radio communication between APs 12 is continuous but infrequent. All transmissions are on the same channel, for example Channel 1, and always at full power
  2. Station-to-AP, AP-to-Station
    a. Radio—When a station 14 is going out of range, it is sent to Channel 1 until is strongly associated with another AP 12.

Figure 12:
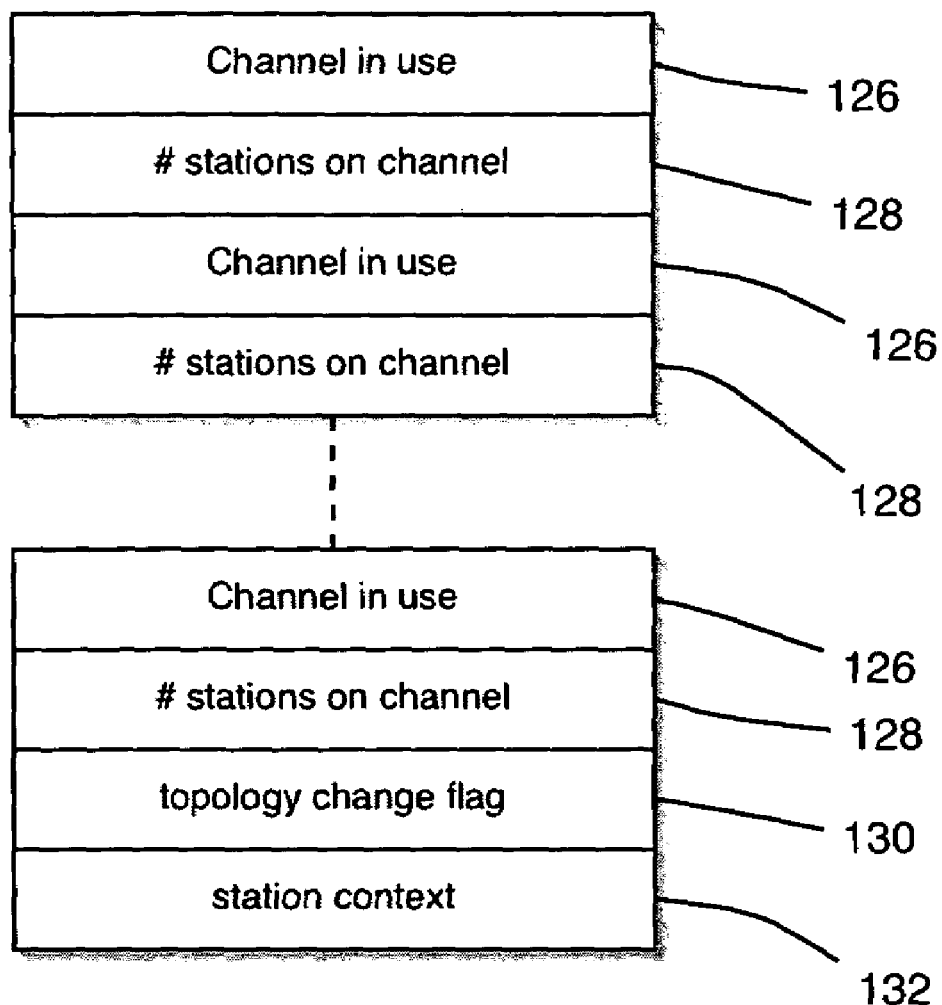
FIG. 12 is an example of the contents of a control message exchanged between access points.

Configuration Management Beacon Content Examples
  Referring to FIG. 12, there is shown an example configuration management packet that can be exchanged between APs 12:
  1. What channels are in use (126)
  2. How many stations 14 are on each channel (128)
  3. A flag is set for all topology changes and causes all APs 12 to rerun the "continuous operation algorithm" (130)
  4. When handoff of stations 14 happens, extant "station context" (security, IP) is passed to the new AP 12 (132)

Figure 13:
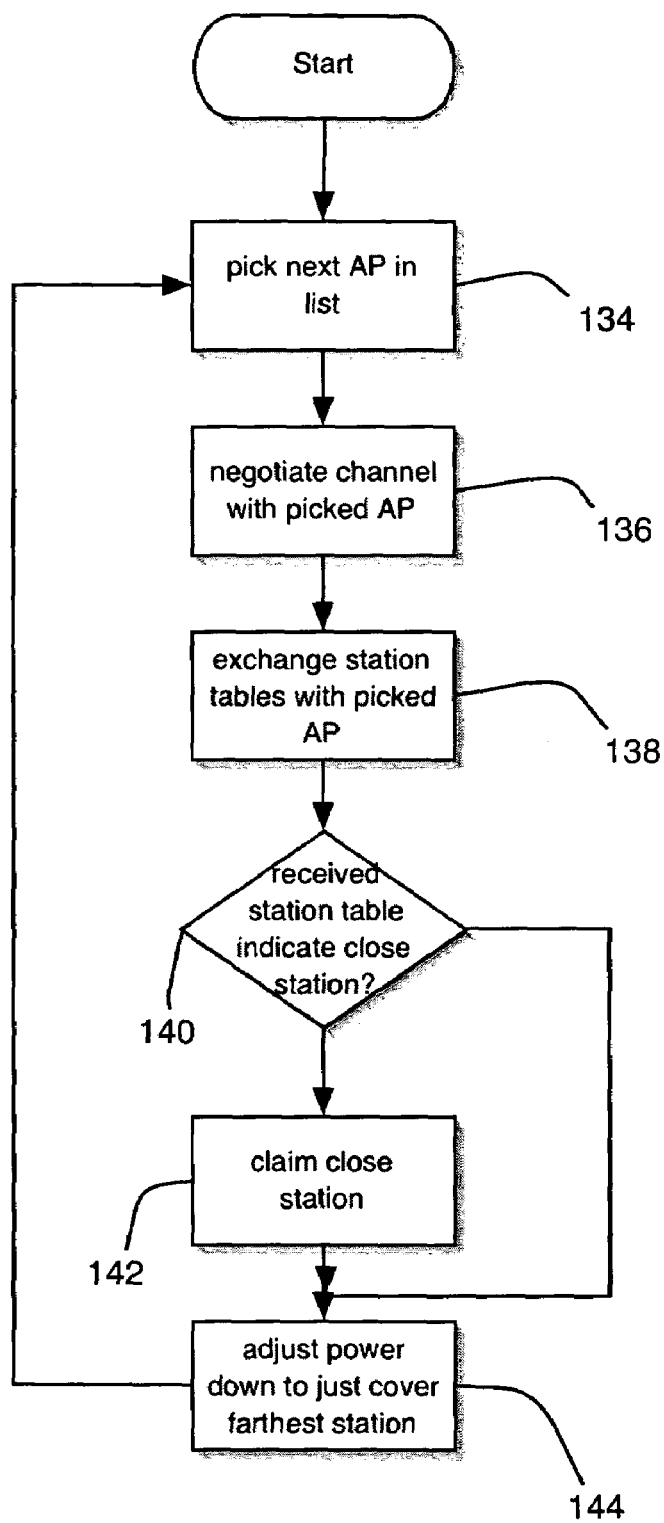
FIG. 13 is a flow diagram of the process by which additional access points are added to an operating network.
Figure 14:
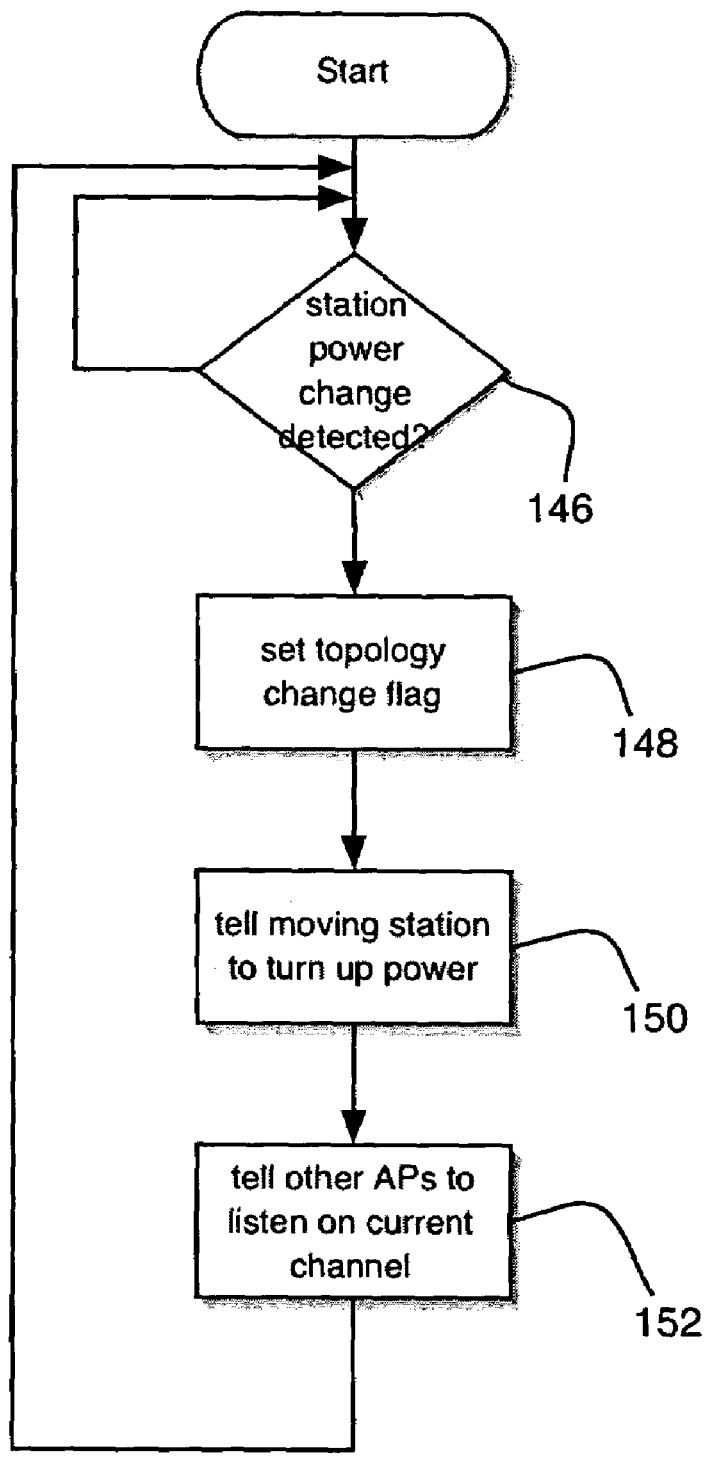
FIG. 14 is a flow diagram of the process by which access points respond to moving clients.

Continuous Operation Algorithm
  Referring to FIG. 13:
  1. APs 12 go through their list of adjacent APs 12 starting from "closest" to "furthest" (step 134).
  2. For each adjacent AP 12, negotiate a non-overlapping channel for operation (step 136).
  3. Each AP 12 maintains a table including, amongst other things, stations 14 associated with the AP 12 and their power levels. For each adjacent AP 12 for which a different channel has been successfully negotiated, exchange station tables (step 138).
  4. APs 12 claim any station 14 which is "closer," as indicated by power levels in the station tables. Round robin assignment is used for ties (step 140, 142).
  5. APs 12 adjust their power down on the selected channel to the lowest possible to reach the "furthest" station (step 144).

Moving Station Scenario
  1. An AP 12 detects a power change in a station 14 (historesis on the power change measurement can reduce false movement detection) (step 146).
  2. The AP 12 then sets "topology change flag" (step 148).
  3. The AP 12 tells the moving station 14 to raise power to a maximum (step 150).
  4. The AP 12 tells other APs 12 to listen on that channel (step 152).
  5. Optional: Shift all moving stations 14 to Channel 1 until the stations 14 stop moving, then re-associate with appropriate AP 12.

Optimizations
  1. Optimize channel assignment so that introducing a new AP perturbs the least number of current channel assignments.
  2. Dampen station power measurements:
    a. Not continuous;
    b. Samples at an interval;
    c. "n" new power levels observed before the AP signals a topology change.
  3. Actions undertaken upon topology change detection:
    a. Signal to IP or other layers, applications;
    b. Each station has a "context page" that gets passed to whichever AP the station gets associated with;
    c. Signal to pre-authenticate via 802.1x at the next AP.

III. Details of AP Naming

To prevent 2 adjacent (independent) AP based networks from attempting to merge with each other a unique identifier (ie, a "name") associated with a given AP based network needs to be created. This operation is fundamentally a manual operation. This is because to the extent that there is wireless-to-wireless communications between APs, the APs need to know which ones are part of "their network" as opposed to an adjacent one. If there is no AP-to-AP wireless (control) communications then the APs do not need to be named.

Figure 15:
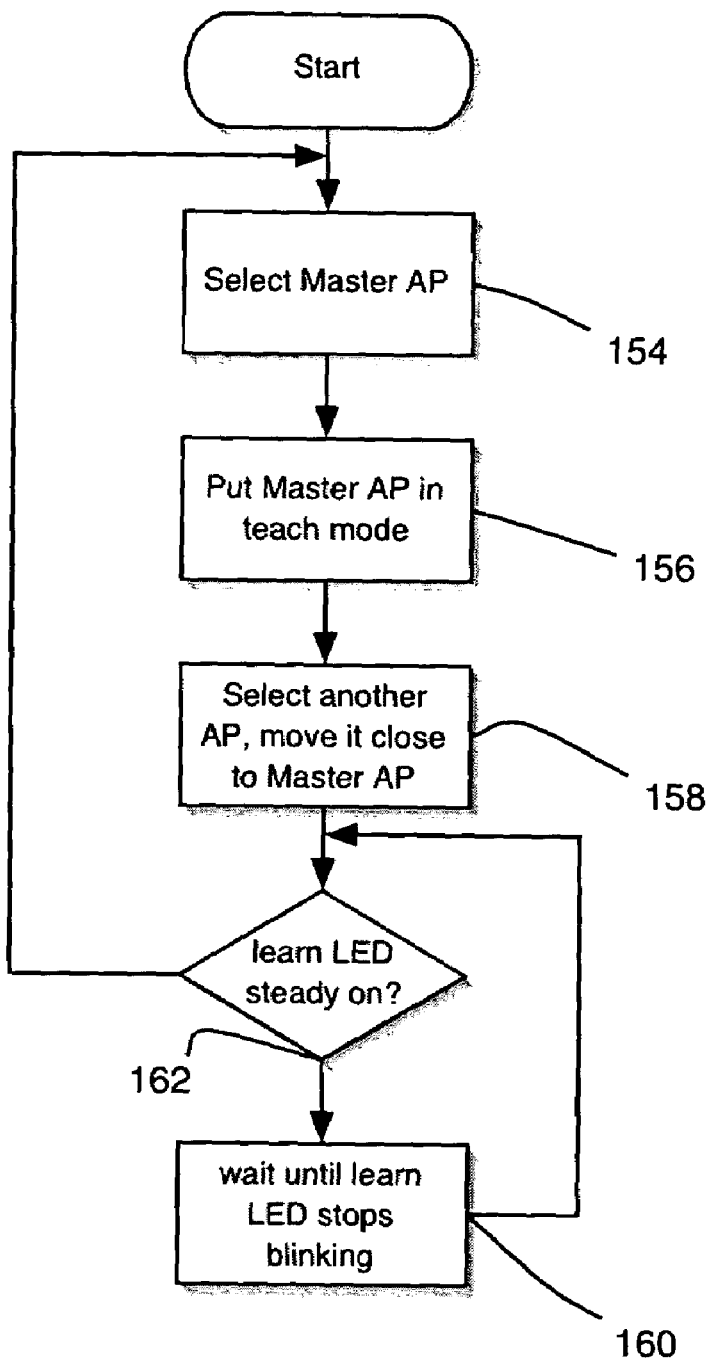
FIG. 15 is a flow diagram of one process by which access points can acquire a network name.

There are several alternative approaches to name APs. They are as follows:

Naming Using RF
  Referring to FIG. 15,
  1. Select an arbitrary AP 12, usually during initial installation of the network. It will be the "master" (step 154).
  2. Push a "teach" button on the master AP 12 (step 156). This causes it to transmit very low power RF. Notice that a LED 157 (FIG. 2) indicates it is in "teach mode". This prevents it from being heard by APs 12 in adjacent networks. It may only transmit a few feet.
  3. Select any other AP 12. Bring it close to the master AP 12 while it is in "teach mode" (step 158). The master AP 12 tells the other AP 12 the name. The name the Ethernet ID from the master AP 12. This will be a 48 bit number which is unique over all space. Notice that an AP LED 159 indicates that it is (a) first learning (blinking LED) (step 160), and then (b) completed learning the name (step 162). At that point there are 2 APs 12 with the name. Either can be used to teach other APs 12 the name in the same fashion. Each time a new AP 12 learns the name, it can then be used to teach other APs 12.
  4. Repeat steps 2 and 3 until all APs 12 have learned the name.
  5. When a new AP 12 is to be added to a running network (which already has a name), select any random AP 12 in the operational network and place it into teach mode. Bring the new AP 12 close to it as in step 3. When learning is complete on the new AP 12, place the teaching AP 12 back into operational mode.
  6. Note that if the APs 12 have a separate control radio then this would be used for the learning operation. In that case, the APs 12 could continue normal operation while this is happening. However, if this is the case, they cannot remain in "teach mode" for a long time because this would prevent AP-to-AP wireless control communications.

7. If an AP 12 is in "teach mode" and it has not taught the name to another AP 12 for T1 seconds then it should automatically revert back to normal mode.
8. If an AP 12 is in "learn mode" it should remain there for T2 seconds and then automatically revert back to "uninstalled mode". Note that T2>T1.

Naming Using IR

Since IR has line-of-sight attributes, this eliminates the need to reduce the RF power of the control channel to prevent outsiders from hearing/learning the name.
 1. The algorithm is identical to the RF scheme above
 2. The learning AP 12 must be pointed carefully at the teaching AP 12 because it uses line-of-sight IR Naming Using External Notation This approach involves a network management PC in the naming operation. Each AP 12 is assumed to have visible on it a 48 bit Ethernet ID. They may also have a bar code on them which encodes this information.
 1. Select an arbitrary AP 12, usually during initial installation of the network. It will be the "master".
 2. Read the Ethernet ID from the AP 12. Type it into the management PC, or
 3. Scan the bar code on the master AP 12 using a simple bar code scanner plugged into the management PC.

We claim:

1. An access point operable to provide wireless network access to client devices coupled to a wireless network, the access point comprising:
 a controller that automatically chooses one of a plurality of radio frequencies on which to operate, said controller choosing said frequency after evaluating frequencies on which other access points operate, said controller comprising:
 a. logic for picking a frequency;
 b. logic for transmitting on said frequency;
 c. logic for receiving on said frequency;
 d. logic for evaluating whether other access points are heard on said frequency;
 e. logic for reducing transmission power;
 f. logic for evaluating whether said other access points are still heard on said frequency;
 g. logic for storing the transmission power at which no other access points are heard;
 h. logic for picking a next frequency as the frequency and repeating steps b-g until all of the plurality of frequencies has been picked;
 i. logic for comparing said stored transmission powers;
 j. logic for choosing for operation the frequency associated with the highest stored transmission power.

2. A method comprising the steps of:
 providing an access point operable to provide wireless network access to client devices coupled to a wireless network;
 automatically choosing by the access point one of a plurality of radio frequencies on which to operate, after evaluating frequencies on which other access points operate,
 wherein the step of automatically choosing comprises the steps of:
 a. picking a frequency;
 b. transmitting on said frequency;
 c. receiving on said frequency;
 d. evaluating whether other access points are heard on said frequency;
 e. reducing transmission power;
 f. evaluating whether said other access points are still heard on said frequency;
 g. storing the transmission power at which no other access points are heard;
 h. picking a next frequency as the frequency and repeating steps b-g until all of the plurality of frequencies has been picked;
 i. comparing said stored transmission powers;
 j. choosing for operation the frequency associated with the highest stored transmission power.

* * * * *